Jan. 11, 1938.  M. MAUL  2,105,291
RECORD CARD CONTROLLED MACHINE
Filed March 24, 1932  3 Sheets-Sheet 1
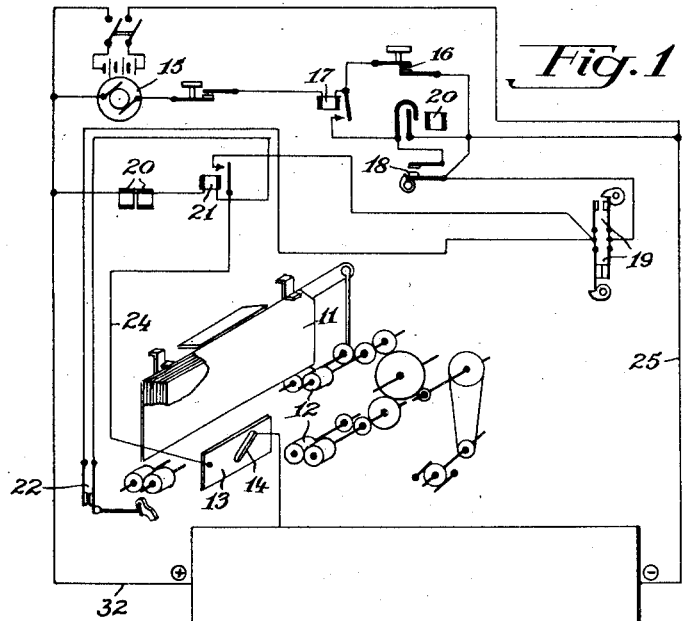
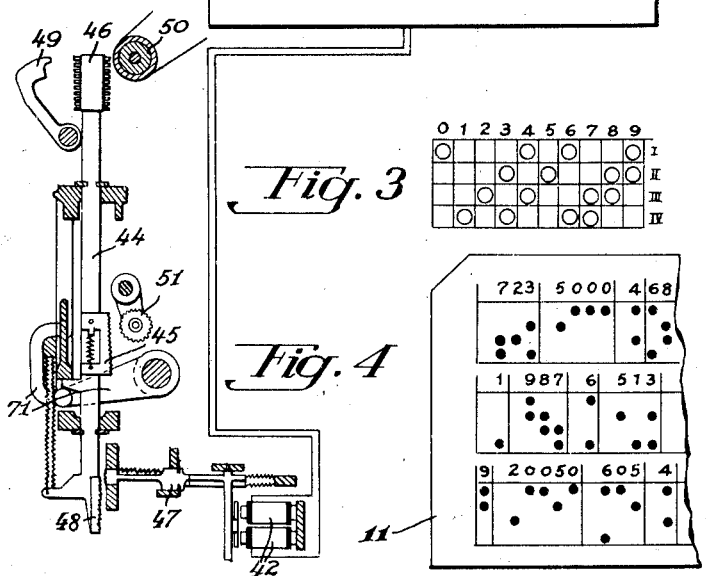
Inventor:
Michael Maul

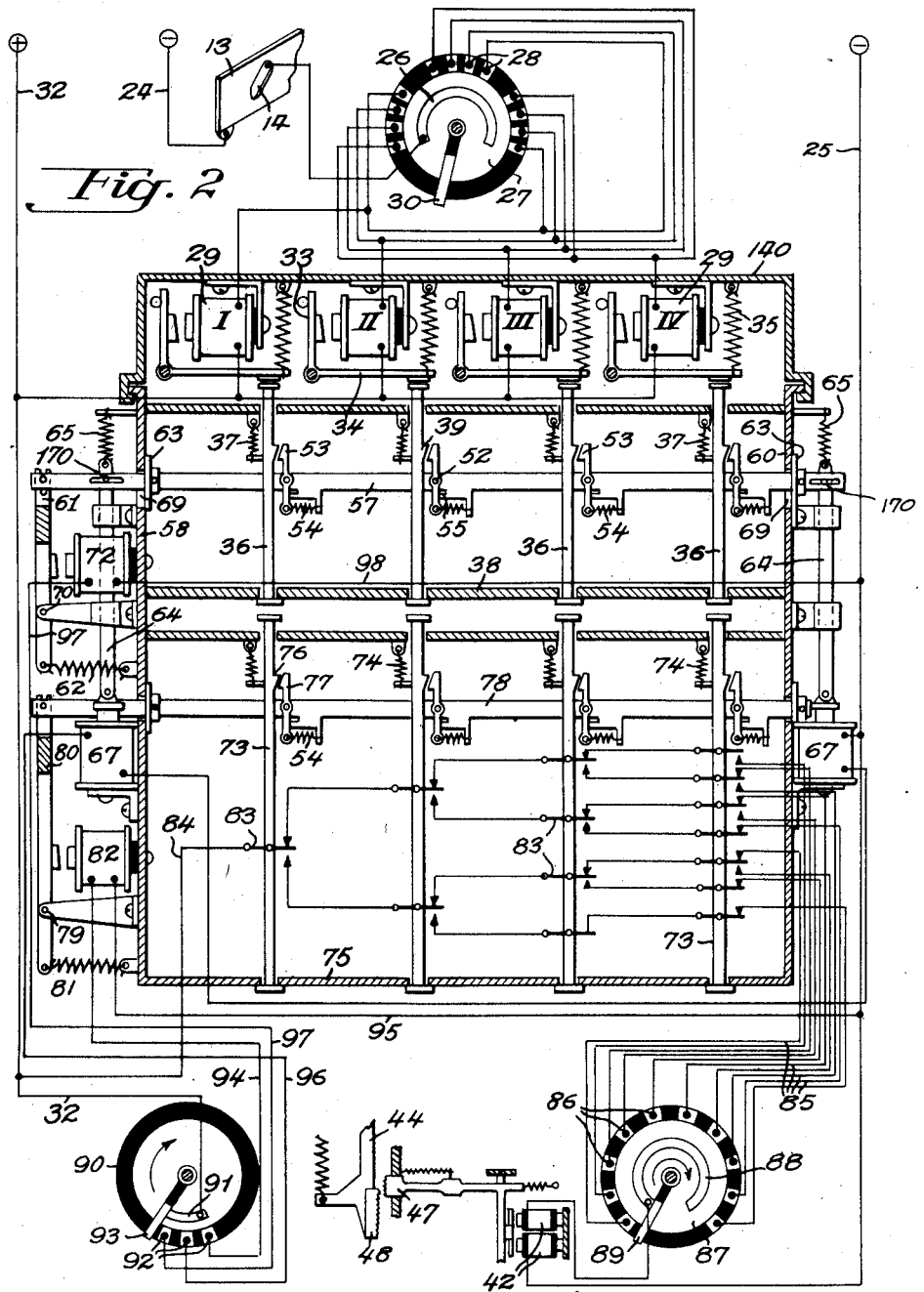

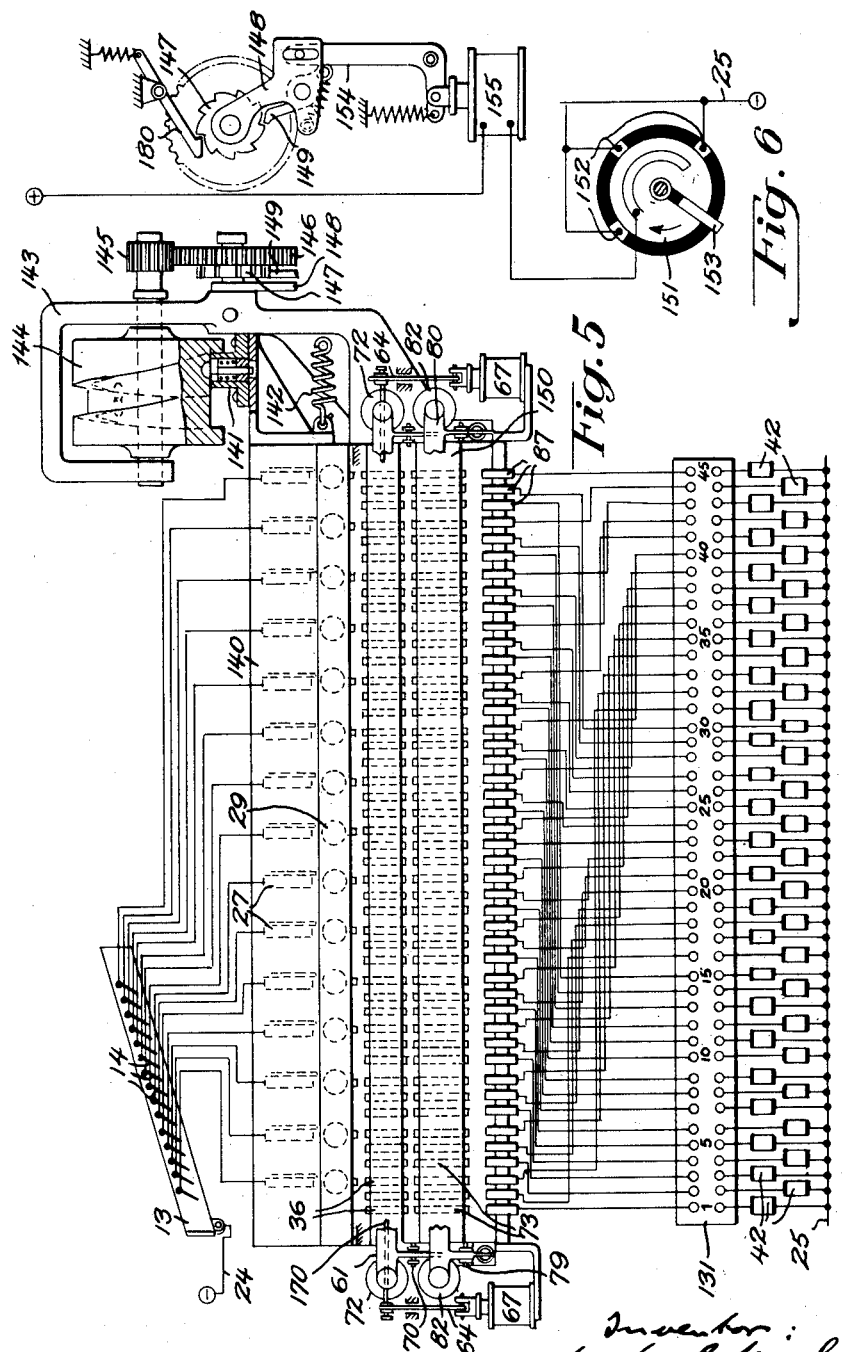

Patented Jan. 11, 1938

2,105,291

UNITED STATES PATENT OFFICE 2,105,291

RECORD CARD CONTROLLED MACHINE

Michael Maul, Berlin-Biesdorf, Germany

Application March 24, 1932, Serial No. 600,961
In Germany April 14, 1931

8 Claims. (Cl. 235—61.6)

The present invention relates to perforated record card controlled machines and more particularly to card controlled tabulating machines having entry receiving means such as accumulating and/or printing means, one entry receiving unit being usually provided for each record column.

It is the main object of the invention to provide a card controlled machine in which record columns of the card are successively analyzed by common analyzing means, the result of said analysis being stored in storing means which in turn control the entry receiving means, said storing means including also one storing unit for each record column.

This manner of operation is of great importance particularly in two types of machines:

There are tabulating machines operating upon record cards having a plurality of superpositioned card decks each deck comprising a plurality of record columns. The decks and sections of the card columns lying within any deck are also termed designation bearing portions. According to the invention the various decks or designation bearing portions may be analyzed by a common set of analyzing means—the record columns in one deck or portion being, however, simultaneously analyzed—and the entry receiving means can be controlled in accordance with the perforations in all record columns of each deck or portion.

Further, it has already been suggested to control a machine, as for instance a calculating typewriter by record cards, successively analyzing adjacent record columns of the card; however, in this instance an invariable relation must exist between the arrangement of the record columns and the numerals printed upon the record sheet. The present invention permits successive analysis of the record card and at the same time gives freedom in the indicated relation between the card columns and the printed numerals by using storing means of the type referred to.

A further object of the invention is to use two sets of storing means of which one set is under record card control while in the same machine cycle the other set controls the entry receiving means.

A further object of the invention consists therein to use for the purpose set forth two sets of storing means of which the one set is in each machine cycle under the control of the analyzing means while the other set controls the entry receiving means, means being provided to govern the latter set by the first set between consecutive entering operations, as is described in my copending application Ser. No. 512,056, filed June 29th, 1931.

A further object is to control said entry receiving means simultaneously in a plurality of units corresponding to a plurality of record columns successively analyzed by common analyzing means.

A further object of the invention is to provide a machine of the character referred to wherein the total analyzing period for the successive analysis of a plurality of record columns by the common analyzing means corresponds about to the controlling period of said entry receiving means.

Further objects and advantages of the invention will be seen from the following specification and the accompanying drawings which illustrate a preferred embodiment of the invention.

Fig. 1 shows the diagram of a known tabulating machine; two sets of storing means which are used in connection with the present invention and which are shown more in detail in Figs. 2 and 3 are indicated in Fig. 1 for reasons of simplicity merely by a casing.

Fig. 2 shows diagrammatically the two sets of storing means corresponding to one record column.

Fig. 3 shows the code according to which the hole combinations in the record cards are provided, the location of the various hole positions being designated on the right hand side of roman numerals.

Fig. 4 shows a record card perforated according to the code shown in Fig. 3 and comprising three superpositioned hole combination record decks.

Fig. 5 shows diagrammatically a side view of the device shown in Fig. 2, the shifting mechanism being illustrated for reasons of clarity in an enlarged scale as compared to the other parts.

Fig. 6 shows the device for shifting the controlling magnets relatively to the storing means.

Fig. 1 shows the well known diagram of an electrical tabulating machine for hole combinations, said hole combinations being translated by a translator mechanism into single impulses, as shown for instance in the United States Patent 1,664,539. The cards 11 are fed from a stack of cards downwardly one by one by means of a feed knife, and are then fed by feed rollers 12 between the contact plate 13 and the analyzing brushes of which only one brush 14 for a single record column is shown in Fig. 1. Operation of the machine is started by closure of start contact 16, thereby establishing a current circuit over the tabulator motor 15 and relay 17. Energization of motor relay 17 will establish a holding circuit for the tabulator motor 15 over the armature of relay 17 and cam contacts 18, the latter being closed after the motor has started for operation. The cards 11 are fed by the feed knife and the feed rollers 12 downwardly and close the card contact 22. The well known cam contacts 19 serve to establish a current circuit to the card contact 22 and control the energization of the relays 20 and 21. The contacts 19 close only when the card passes under the brushes and therefore the relays 20, 21 may only be energized during the same time, and by means of the armature of relay 21 the contact plate 13 is connected only during said period to the contacts 19, but only as long as the consecutive cards keep the contact 22 closed. The contact of relay 20 as well as contact 18 will therefore open once during each machine cycle, however, not simultaneously but with a certain time difference so that the current circuit of the motor 15 will normally be maintained over one of both contacts. After the passage of the last card at 22, the relays 20 and 21 will not be energized since the contact 22 remains open; the contact of the relay 20 will therefore also be open if the contact 18 opens so that the motor circuit is interrupted and the machine is stopped. Each analyzing brush 14 is connected to a controlling mechanism which in accordance with the deck just being analyzed, controls one of a plurality of storing units coordinated to said deck; the storing units of a second set of storing means are provided as translator units and will be explained more in detail in connection with Figs. 2 and 3. Each translator unit has a control magnet 42 (Fig. 1) coordinated thereto which, in accordance with the meaning of an analyzed hole combination, releases a differentially timed current impulse within a complete machine cycle. The entry receiving mechanism may be provided in various ways; in Fig. 1 it has been assumed that the same comprises for each record column a control bar 44 having a ratchet frame 45 as well as a set of type 46. During each machine cycle all control bars 44 are raised once by a reciprocating frame 71 and according to the meaning of the analyzed hole combination, the magnet 42 of each unit will be energized at different moments thereby releasing in a known manner the latched pawl 47 which will engage the teeth 48 of the control bar 44, thereby stopping the same in its upward movement. At the end of each analyzing cycle the type in printing position is impelled by the type hammer 49 towards the printing platen roller 50, and before the downward movement of the various control bars 44 takes place the accumulator wheels 51 pivotally mounted upon a frame and normally disengaged from the ratchet frames 45, are rocked in engagement with the latter; consequently, upon the restoring movement of the control bar 44 (said movement taking place at the end of the machine cycle) the printed amount, corresponding to the meaning of the hole combination, will be entered into the accumulator wheel 51. The described accumulating and printing mechanism is well known in the art and is shown more in detail for instance in United States Patent No. 1,791,762.

Total taking of the data of the cards may be effected in the known manner by a total taking operation of the machine if all cards have been fed through the machine, or by total taking or stop cards inserted between the various card groups. Upon each total taking operation the totals of all selected columns of all decks will be simultaneously taken. Resetting of the accumulator wheels at the end of each card group, or at the end of the accounting operation may, of course, also be effected in the known manner, and if desired the accumulator wheels may also be provided with number wheels in order to permit reading of the totals and manual recording of the same. Since all these operations are well known and need not be modified in any manner upon application of the present invention, a more detailed reference thereto seems not necessary.

I will now describe more in detail the storing means (Fig. 2) used in connection with the present invention, in combination with a well known translator device for hole combinations. In the preferred embodiment each storing unit in the first and second set of storing means forms a latchable set-up unit and the set-up units of the second set of storing means are also acting as translator units. In Fig. 2 the first set-up device as well as the translator are shown only for a single record column and the magnet unit comprising four magnets 29 is also coordinated to a single analyzing brush 14 for a single record column. The machine illustrated is adapted for cards having three decks each comprising 15 record columns. Of course, any number of columns, for instance 45 record columns may be provided in each deck, if desired. Since, however, with 15 columns in each deck the illustration of the mechanism in Fig. 5 is simplified and since moreover the 45 columns comprised in the three decks of such cards are usually sufficient for practical purposes, for the present specification only 15 columns have been assumed in each deck. With such cards, 15 magnet units and 45 set-up and translator units must therefore be provided as will later be described more in detail. The contact plate 13 is connected by line 24 (Fig. 1) to the right hand side of the current source 25 while the analyzing brush 14 (Fig. 2) is connected to a contact strip 26 of a commutator generally indicated at 27. The commutator 27 includes three groups of contact pieces 28, each group comprising four of said pieces which are parallelly connected to a single group of four lines, each of said lines being in turn connected to a coordinated translator magnet (29—I to 29—IV). The commutator 27 includes also a contact arm 30 rotating once during each machine cycle synchronously with the uninterrupted passage of the card past the brush 14, and connecting thereby the contacts 28 one by one to the contact strip 26. Provision has been made that the contact arm 30 is in connection with the corresponding contact pieces 28 when the coordinated hole positions of the decks of the card shown in Fig. 4 pass under the analyzing brush 14. If therefore in the lower deck of the card there are holes provided in certain positions, the control magnets 29 of the identical roman designation will be energized instantaneously; the same magnets 29 will again be energized instantaneously when holes of the middle deck pass beneath the brush 14 and the same set of magnets will be energized a third time within a machine cycle if the uppermost deck passes under the brush 14. The control magnets 29 will therefore be energized upon the consecutive passage of three aligned record columns of the three decks in accordance with the perforations in said decks and upon each energization the bell crank levers 33, 34 will be rocked momentarily in clockwise direction against the tension of spring 35 thereby effecting the adjustment of the set-up mechanism of the first set of storing means in the manner still to be described. The bell crank levers 33, 34 act upon bars 36 which are pressed downwardly by said levers upon energization of the magnets 29, and the depressed bars 36 will be latched by pawls 53 and will be retained in the latched position.

During the consecutive analysis of the three decks, the same group of magnets will be controlled by the superpositioned columns of the three decks, however, upon energization by the holes in the three aligned record columns, the magnets 29 will not act upon the same set-up unit of bars 36 but upon three different units of such bars, said units being arranged side by side. In the present instance 15 brushes 14 (see Fig. 5) are provided, and accordingly there are also 15 groups or units of magnets 29 provided which are arranged in the casing 140; said casing is slidable in longitudinal direction upon the casing 58, 75, 60 enclosing the set-up and translator mechanism. As will be described in connection with Fig. 3, the longitudinal adjustment is effected in such a manner that upon the passage of the lower deck under the brush the unit of four controlling magnets 29 (Fig. 2) is adapted to act for instance upon the illustrated group of set-up bars 36. When the space between the lower and middle decks passes beneath the brushes 14, the casing 140 is moved to the side for an amount corresponding to the distance between two adjacent units of set-up bars 36 so that the control magnets 29 will act upon the adjacent unit of set-up bars in accordance with the perforations in the middle deck if the magnets 29 are energized upon the passage of said deck under the respective brush. Upon the passage of the space between the middle and the upper deck beneath the brushes 14 the casing 140 is moved another step in the same direction as before so that now the same magnets 29 will act upon a third unit of bars 36 and consequently the latter will be adjusted in accordance with the perforations in the upper deck. If a card has passed under the brushes and before the following card is analyzed, the result of the analysis represented by the adjustment of the latched bars 36 will be transferred in the manner later to be described from the bars 36 to the bars 73; the bars 36 will then be released from the latched position and the casing 140 will again be restored to its home position. Upon energization by the subsequent card, the magnets will therefore again act under the influence of the lower deck upon the same set-up unit of bars 36 as during the analysis of the lower deck of the preceding card and the same relations will exist if the middle and upper deck of said card pass beneath the brush. For each record column in each deck there is one of the above mentioned set-up units provided comprising a group of four bars 36; the bars 36 are drawn by a spring 37 with their lower ends against the bottom plate 38 so that they are normally held in the position shown in the drawings. Each bar 36 is provided with a lip 39 just above a pawl 53, the latter being pivotally mounted at 52. The pawl 53 is drawn by a spring 54 against the stop 55 as illustrated in the drawings (Fig. 2). All bars 53 of one set-up unit are provided upon a common bar 57 which projects through the side walls 58, 60 to the outside of the casing. Each unit of the bars 36 and of the bars 73 which will later be described corresponds to one unit in the entry receiving mechanism. The bars 57 cooperate through a pin and slot connection with a control plate 61 slotted and pivotally mounted at 70, and the bars 57 are under the influence of the spring 62, normally holding the plate 61 in the left hand position, in which the flanges 63 of the bars 57 engage the walls 58 and 60. Further, all bars 57 are provided on opposite ends with a slot, and through said slots projects a common bar 170 connected on its rear and front end (see also Fig. 3) with two bars 64 which are drawn by springs 65 upwardly so that the bars 57 are normally held in the position shown in Fig. 2. If the magnets 67 arranged in pairs on each side of the casing are all simultaneously energized, the bars 64 will be drawn downwardly and consequently also all pawl carriers 57 will be moved downwardly in the slots 69 of the walls 58 and 60 and will return under the influence of the springs 65 to their home position upon deenergization of the magnets 67. The plate 61 which is pivotally mounted at 70 is rocked upon energization of the pair of magnets 72 (see Fig. 3) in clockwise direction (Fig. 2) and will thereby move all bars 57 to the right; during this movement, the bars 57 are guided with their slots upon the cross bars 170 of the bars 64.

The mechanism described heretofore comprising the bars 36, the pawls 53 etc. represents the set-up mechanism acting as the first set of storing means which cooperates with the second set of storing means as will now be described. The second set of storing means comprises also a unit of set-up bars which act as translator means. The set-up and translator unit for each record column comprises four bars 73 (Figs. 2 and 5) coordinated to the set-up bars 36. The bars 73 are guided in slots of the translator casing and are drawn by springs 74 with their lower ends against the bottom plate 75 and are thus held in the position illustrated in the drawings. In a similar way as has been explained in connection with the first storing mechanism, each bar 73 has a lip 76 adapted to cooperate in a similar way as above described with a pawl 77. The pawls 77 of each unit are mounted upon a common pawl carrier 78 guided in slots of the walls 58, 60 and normally drawn under the influence of a spring 81 to the left through a pin and slot connection by means of an actuating plate 80 pivotally mounted at 79, said plate having in its upper part a longitudinal as well as cross slots. Into the cross slots engage the left hand ends of bars 78 (Fig. 2) while in the longitudinal slot engages a common bar constituting the pin of the aforesaid connection. The actuating plate 80 extends over the entire length of the translator casing and is common to all translator units for the various registering units. The bars 78, however, are movable only in horizontal direction and are moved to the right upon energization of magnets 82 arranged on opposite sides of the translator casing. The bars 73 of each unit are provided in a known manner (as shown in the above mentioned United States Patent 1,664,539) with a number of shift contacts 83 which are adapted to select (depending upon the adjustment of the bars 73 in different combinations) a single live line between the line 84 and one of the lines 85. The terminals of lines 85 are connected with contact pieces 86 of a commutator generally indicated at 87; the contacts 86 are equally spaced upon the circumference of the commutator 87 corresponding to one complete machine cycle; between the first and last contact piece there is a certain blank space (over which in Fig. 2 the arm 89 stands) corresponding to the distance between two consecutive cards past the brushes. The control magnet 42 for each registering unit is connected to the contact strip 88 of the commutator 87 coordinated to said unit. The commutator 87 (Fig. 2) includes a contact arm 89 rotating once during each machine cycle synchronously with the passage of the card under the brushes and thereby connecting the contacts 86 one by one with the contact strip 88. Since the bars 73 are then adjusted in different combinations as will still be described, a live line 85 will be selected corresponding to the meaning of the hole combination. When the arm 89 slides over the contact piece 86 of the selected line 85, a current impulse will be sent instantaneously through magnet 42 and since the coordinated control bar 44 raises in the above described manner synchronously with the rotation of arm 89, the bar 44 will be arrested by the released pawl 47 in a position corresponding to the meaning of the analyzed hole combination and consequently an amount corresponding to the meaning of said hole combination will be printed and will also be entered into the accumulator as has been described.

For the control of the pairs of magnets 67, 72 and 82 there is a commutator 90 provided having a contact strip 91 and three adjacent contact pieces 92. The arm 93 of said commutator which is shown in Fig. 2 in its normal position, rotates synchronously with the arms 30 and 89 of the two other illustrated commutators and, as will be clearly seen from the drawings, said arm connects during the interval between two consecutive registering operations at first the right hand contact piece 92, then the middle contact piece 92 and finally the left hand contact piece 92 to the contact strip connected to the left hand side 32 of the current source. The right hand contact piece 92 is connected over line 94 to magnet 82 and the common back line 95 of said magnet leads to the right hand side 25 of the current source. The middle contact piece 92 is connected over line 96 with four magnets 67 every two magnets being switched parallelly and the two pairs being in series, said magnets being also connected to the right hand side 25 of the current source. The left contact piece 92 is connected over line 97 to the magnet 72, the back line of which leads also to the right hand side 25. During the synchronous movement of all commutator arms 30, 89 and 93, the contact arm 89 will analyze the contacts 86 during the major part of the machine cycle covered by the entering operation while about essentially simultaneously the three groups of contacts 28 (corresponding to the arrangement of the hole positions upon the card according to Fig. 4) are analyzed by the contact arm 30 and during the period between two consecutive entering operations the contact arm 93 will energize at first the magnets 82, then over line 96 both pairs of magnets 67 and thereupon the magnets 72.

Now the operation of the two sets of storing means will be explained more in detail in connection with the operation of the machine. If the machine is in normal position all parts are in the position as shown in the drawings. If the machine is then started and the respective hole combinational column of the lower deck of the first record card passes under the brush 14, the arm 30 will connect the contacts 28 of the first group of contacts one by one and the magnets 29 will be instantaneously energized in accordance with the passage of the holes of the column under the brush. Through this energization the coordinated bell crank levers 33, 34 will momentarily be rocked in clockwise direction thereby pressing the set-up bars 36 downwardly; the nose 39 of each bar snaps then past the latch 53 so that the bar will be retained if the arm 33, 34 returns to its normal position under the influence of spring 35. At the end of the passage of a hole combination of the lower deck past the analyzing brush 14, the set-up bars 36 will therefore be adjusted either singly or in different combinations as determined by the holes of the record column which has passed under the brush. Upon the passage of the middle and upper deck under the brushes, the magnets 29 will be moved in the manner later described laterally to adjacent set-up units so that all 45 set-up units of the first set of storing means will be adjusted at the end of the card passage in accordance with the perforations of said card in all decks. During the first machine cycle, however, also the arm 89 of each unit has been rotated and the contacts 86 are analyzed one by one. Since, however, the translator bars 73 remain during this cycle in their illustrated home position in which no connection between line 84 and any one of the lines 85 exists, the magnet 42 will receive no current impulse during the first cycle so that the registering mechanism performs an idle cycle. The set-up bars 36 are pressed by the magnets 29 upon analysis of a corresponding hole so far downwardly and are held by the latches 53 in such a position that their lower end is just above the head of the coordinated bars 73, however, without engaging the same so that the respective bars 73 are not influenced by the movement of bars 36 due to the energization of magnets 29. Now, at the end of the first entering or registering operation and before the beginning of the second registering operation the three contacts 92 of the commutator 90 will be connected one by one with the contact strip 91; this causes at first a current impulse over line 94 to the magnets 82 thereby energizing the same and moving the pawl carriers 78 of all units to the right. This movement would serve to release all translator bars 73 which might have been latched in the previous machine cycle. Since, however, during the first registering cycle no bars 73 have been adjusted there will also be no release in this moment and the movement of the bars 78 to the right at the end of the first registering cycle will be an idle movement. Thereupon the four magnets 67 will be simultaneously energized over line 96 thereby moving the pawl carriers 57 of all units downwardly by means of bars 64. It has already been explained that the bars 36 in each set-up unit are kept in latched position in a combination corresponding to the hole combination contained in a column of the preceding card and that the lower ends of the actuated set-up bars are just above the heads of the coordinated bars 73 while the bars 36 which have not been set up will remain in their illustrated position. Consequently, if the bars 57 are moved downwardly, the actuated set-up bars 36 will press their coordinated translator bars 73 downwardly which will then be held latched in the lower position. If therefore after deenergization of the magnets 67 the bars 57 have again returned to the illustrated position, the adjustment of the bars 36 will have been transferred to the bars 73 and the latter will then be adjusted in accordance with the hole combinational columns of the various decks which have passed under the brushes and the bars 73 will select in each unit a current circuit over one of the lines 85, the selected line corresponding to the meaning of the hole combination; however, this circuit will not yet be effective since there is no conducting connection between the contacts 86 and the contact strip 88. Upon the further movement of arm 93 between two consecutive registering operations, magnets 72 will be energized over line 97 and consequently the control bar 57 in each unit will be moved to the right; the bar 57 is held during said movement in the illustrated horizontal position by bars 64 or cross bars 170 respectively. Due to said movement of bars 57 to the right, the pawls 53 are disengaged from the noses 39 so that all latched bars 36 are permitted to return under the influence of springs 57 to normal position. It will be clearly seen that before the beginning of the second registering operation the translator bars 73 are adjusted corresponding to the hole combinations of all columns of all decks of the previous card and that the set-up bars 36 are in their normal position in which they are ready to be adjusted by the hole combinations of the subsequent card. Now, during the second registering operation, analysis of the translator is effected by the arm 89 and it will be clearly seen that for this purpose almost the whole machine cycle is available. During the second registering operation the magnet 42 of each unit will be controlled corresponding to the meaning of the coordinated hole combinational column of the previous card and within the same time the commutator 27 effects in three subsequent steps the control of three adjacent units of set-up bars 36 in accordance with the hole combination columns of the three decks of the second card which now follows.

These operations will now cyclically continue as long as cards are passing through the machine, i. e. during one machine cycle the set-up bars 36 of each unit are adjusted corresponding to the analyzed hole combination; at the end of the registering operation in this machine cycle the bars 73 are released by magnets 82 from the previous adjustment and thereupon the adjustment of the set-up bars 36 is transferred to the bars 73 (the new adjustment of which is then analyzed during the following registering operation) and after said transferring or governing operation the bars 36 are released to clear the same for adjustment by the subsequent record card. If the card supply is exhausted the machine is automatically stopped in the above described manner; a further machine cycle will then be necessary in order to exploit the adjustment of the translator from the last card; for this purpose the start key may again be depressed after the automatic stop in the generally known way or a retarding mechanism (as shown for instance in United States Patent 1,955,819) may be coordinated to the machine holding the same in operation for one machine cycle longer.

I will now describe in connection with Figs. 5 and 6 the shifting of the magnet casing 140 relatively to the set-up bars 36 and to the translator bars 73. Fig. 5 shows diagrammatically the connection of the analyzing brushes 14 to the commutators 27 (one being coordinated to each analyzing brush) and to the groups of magnets 29 (one group being coordinated to each analyzing brush); said commutators are shown more in detail in Fig. 2. There are altogether 15 of such groups provided in accordance with the 15 analyzing brushes of the machine. Below the casing 140 is a casing provided including the set-up and translator means constituting the first and second set of storing means; the first set of set-up means comprises 45 units each including four set-up bars 36 (see Fig. 2) and the second set comprises as many units of translator set-up bars each unit comprising four bars 73. The casing 140 is movable relatively to the casing generally designated by the numeral 150 and is normally held by a spring 142 in the position shown in Fig. 5. The means which serve for shifting the casing 140 are shown for reasons of clarity in an enlarged scale as compared to the remaining parts. To the casing 140 is fastened a guide projection 141 engaging into the groove of a guide drum 144 rotatably mounted on a bracket 143 fastened to the casing 150. The shaft of the guide drum 144 has fastened thereon a toothed wheel 145 meshing with a wheel 146. To the wheel 146 is fastened a ratchet wheel 147 adapted to be shifted for one step by means of a pawl 149 upon each energization of the magnet 155; said pawl is pivotally mounted upon the lever 148 which is under the control of said magnet. The ratchet wheel 147 and consequently also the guide drum 144 are held in position by means of a stop pawl 180 and pawl 149. The guide drum 144 is so constructed that after one third revolution in the forward direction (Fig. 5), such partial rotation taking place each time after a hole combinational deck has passed beneath the brushes, the guide projection 141 and consequently the casing 140 are moved to the left for one step so that all magnet units 29 are moved laterally to the units of the set-up bars 36. As shown in the drawings, the first group of magnets is adjusted above the third unit of bars 36, the second group of magnets above the sixth unit and so on, the fourteenth group of magnets above the forty-second unit of bars 36 and the fifteenth group of magnets above the forty-fifth unit of bars 36. If the drum is rotated for one-third and if consequently thereof all groups of the magnets are moved for one step to the right, the first group of magnets is moved over the second set-up unit, the second group of magnets over the fifth, the fourteenth over the forty-first and the fifteenth group of magnets over the forty-fourth unit of bars 36. Upon the next rotation of the drum 144 for one-third in forward direction, the casing 140 will be shifted to the left for another step so that the first group of magnets will now come over the first unit of bars 36, the second group of magnets over the fourth set-up unit, the fourteenth group of magnets over the fortieth set-up unit and the fifteenth group of magnets over the forty-third set-up unit. If the drum 144 is again rotated for one-third revolution it will return to normal angular position and due to the recess in the groove of the drum 144 (as shown in Fig. 5) the casing 140 will be drawn under the influence of the spring 142 to its home position. It will therefore be seen that during one rotation of the drum in three shift steps all forty-five units of set-up bars 36 are set under the control of the fifteen groups of magnets 29 so that at the end of the operating cycle the set-up bars 36 are adjusted in all 45 units in accordance with the three times fifteen record columns of the three different decks of the record card. The shifting of the casing 140 may, of course, be effected in various ways and can be caused preferably mechanically, for instance under the control of a cam. However, in order to make the time sequence of the controlling operations quite obvious, in the present embodiment (Fig. 6) an electromagnetic device has been used for effecting the shifting of the casing enclosing the controlling magnets.

The ratchet wheel 147 comprises nine teeth and the diameter of the wheel 146 is three times as large as that of the wheel 145 so that upon shifting of the wheel 147 for one tooth, the drum 144 will rotate for one-third revolution. Upon comparison of the commutator 151 serving for the control of the magnet 155 with the commutator 27 (Fig. 2) it will be seen that the arm 153 energizes the magnet 155 over contact pieces 152 from line 25 when the first deck, then when the second and finally when the third deck has passed beneath the analyzing brushes so that then the device is again in the home position. The arm 153 will, of course, rotate synchronously with the arm 30 (Fig. 2); Fig. 6 will therefore readily show the time sequence of the operations.

In Figs. 1 and 2 the control magnets 42 of the registering mechanism are inserted directly in the current circuit; however, said magnets may also be controlled selectively by different record columns thus permitting an arrangement of the printed numbers quite independent of the arrangement of the record columns on the card. In order to permit such selective connection, the lines leading from the various translator commutators 87 are connected (as shown in Fig. 5) to a plug board 131 in the order 1 to 45 and provision has been made that the connections 1 to 15 correspond to the fifteen columns of the upper deck, the connections 16 to 30 to the fifteen columns of the middle deck and the connections 31 to 45 to the fifteen columns of the lower record deck of the card. The lines leading from the commutators 87 may then be connected selectively by means of plugs from the board 131 to any one of the registering magnets 42 so that any record column may control any registering unit, independently of the location of the record column upon the card.

With the application of record cards having a plurality of hole combinational decks, it frequently occurs that the superpositioned aligned columns analyzed by the same analyzing means shall cause controlling operations of different kind; thus, for instance, a column of the lower deck may be required to control a printing as well as an accumulating operation while the superpositioned aligned columns of the remaining decks may be required to control a printing operation only. Consequently, the same analyzing means must not only act upon different units of the registering mechanism upon the analysis of different columns but, if desired, they must also act upon registering mechanisms of different kind, for instance only upon printing mechanisms or only upon accumulating mechanisms or upon both mechanisms simultaneously. From the above specification will be seen that each record column is adapted to control any registering unit. Upon application of a machine as diagrammatically shown in Fig. 1, there may also be provided such registering units of different kinds; if in any of the entry receiving units printing as well as accumulating shall be effected, the arrangement shown in Fig. 1 is preferred. In units in which printing but no accumulating shall be effected, the accumulating wheel 51 may be omitted or the respective accumulator mechanism may be locked in its rest position so that upon movement of the bars 44 the accumulator wheel will not be actuated. If in certain entry receiving units only accumulating but no printing shall take place, either the types of the bars 44 may be removed or the type hammer 49 in the respective columns may be locked for this purpose so that printing is prevented.

While there have been shown and described and pointed out the essential features of the invention, it will be understood that many alterations and substitutions may be made in the construction and operation of the machine without departing from the spirit of the invention.

What I claim is:

1. In a machine controlled by perforated record cards having a plurality of superpositioned record decks, each deck comprising a plurality of adjacent record columns and the perforations in each column representing a single distinct value, entry-receiving means having a plurality of units under the supervision of said record columns and controlled in a subsequent machine cycle in accordance with the result of the analysis in the preceding machine cycle, a common set of analyzing means for said record decks for analyzing all columns in one deck simultaneously and for successively analyzing said record decks deck by deck, a first storing mechanism having a storing unit for each record column in each deck for retaining the result of the analysis wherein the storing units for each record deck constitute one set of storing units, a set of actuating units for said sets of storing units, said actuating units being also common to said plurality of record decks and each actuating unit being controlled by the analyzing means for one record column, and means for successively placing different sets of storing units of said storing mechanism under the control of said common set of actuating units upon the successive analysis of said plurality of record decks, a second storing mechanism also adapted to retain the result of the analysis and having means for controlling said entry-receiving units in accordance therewith, means for causing said first storing mechanism to govern after analysis in said preceding machine cycle and before the entering operation in the subsequent machine cycle said second storing mechanism, means for clearing said second storing mechanism before said governing operation, and means for clearing said first storing mechanism after said governing operation and before control of the first storing mechanism by the analyzing means upon analysis of the subsequent card.

2. A machine controlled by perforated record cards having a plurality of superpositioned record decks, each deck comprising a plurality of adjacent record columns and the perforations in each column representing a single distinct value, entry-receiving means having a plurality of units under the supervision of said record columns and controlled in a subsequent machine cycle in accordance with the result of the analysis in the preceding machine cycle, a common set of analyzing means for said record decks for successively analyzing said record decks, deck by deck, and for analyzing all columns in one deck simultaneously, a storing mechanism having a storing unit for each record column of each deck for retaining the result of the analysis, means under the control of said analyzing means for actuating said storing units in accordance with the analysis of the related record deck, and means for successively placing different storing units of said storing mechanism under the control of said actuating means upon the successive analysis of said plurality of record decks, another storing mechanism also adapted to retain the result of the analysis and having means for controlling said entry-receiving units in accordance therewith, means for causing said actuating means controlled storing mechanism to govern after analysis in said preceding machine cycle and before the entering operation in the subsequent machine cycle said entry-receiving means controlling storing mechanism, means for clearing said entry receiving-means controlling storing mechanism before said governing operation, and means for clearing said actuating means controlled storing mechanism after said governing operation and before control of said latter storing mechanism by the analyzing means upon analysis of the subsequent card.

3. A machine controlled by perforated record cards having a plurality of superpositioned record decks, each deck comprising a plurality of adjacent record columns, and the perforations in each column representing a single distinct value, entry-receiving means having a plurality of units under the supervision of said record columns and controlled in a subsequent machine cycle in accordance with the result of the analysis in the preceding machine cycle, a common set of analyzing means for said record decks for successively analyzing said record decks deck by deck and for analyzing all columns in one deck simultaneously, a storing mechanism having a storing unit for each record column of each deck for retaining the result of the analysis, means under the control of said analyzing means for actuating said storing units in accordance with the analysis of the related record deck, and means for successively placing different storing units of said storing mechanism under the control of said actuating means upon the successive analysis of said plurality of record decks, another storing mechanism also adapted to retain the result of the analysis and having means for controlling simultaneously all entry-receiving units in accordance therewith while the subsequent card is analyzed, means for causing said actuating means controlled storing mechanism to govern after analysis in said preceding machine cycle and before the entering operation in the subsequent machine cycle said entry-receiving means controlling storing mechanism, means for clearing said entry-receiving means controlling storing mechanism before said governing operation, and means for clearing said actuating means controlled storing mechanism after said governing operation and before control of said latter storing mechanism by the analyzing means upon analysis of the subsequent card.

4. A machine controlled by perforated record cards having a plurality of superpositioned record decks, each deck comprising a plurality of adjacent record columns, and the perforations in each column representing a single distinct value, entry-receiving means having a plurality of units under the supervision of said record columns and controlled in a subsequent machine cycle in accordance with the result of the analysis in the preceding machine cycle, a row of analyzing feelers for successively analyzing said record decks deck by deck and for successively analyzing the hole positions of a record column but analyzing all columns in one deck simultaneously, a storing mechanism having a storing unit for each record column of each deck for retaining the result of the analysis, means under the control of said analyzing means for actuating said storing units in accordance with the analysis of the related record deck, and means for successively placing different storing units of said storing mechanism under the control of said actuating means upon the successive analysis of said plurality of record decks, another storing mechanism also adapted to retain the result of the analysis and having means for controlling simultaneously all entry-receiving units in accordance therewith while the subsequent card is analyzed, means for causing said actuating means controlled storing mechanism to govern after analysis in said preceding machine cycle and before the entering operation in the subsequent machine cycle said entry-receiving means controlling storing mechanism, means for clearing said entry-receiving means controlling storing mechanism before said governing operation, and means for clearing said actuating means controlled storing mechanism after said governing operation and before control of said latter storing mechanism by the analyzing means upon analysis of the subsequent card.

5. A machine controlled by perforated record cards having a plurality of separate designation bearing portions, a perforation or perforations in each portion representing a single distinct value, entry-receiving means having a plurality of units under the supervision of said designation bearing portions and controlled in a later period in accordance with the result of the analysis in an earlier period, a common set of analyzing means for successively analyzing said designation bearing portions, a storing mechanism having a storing unit for each portion for retaining the result of the analysis, means under the control of said analyzing means for actuating said storing units in accordance with the analysis of the related portions, and means for successively placing different storing units of said storing mechanism under the control of said actuating means upon the successive analysis of said plurality of portions, another storing mechanism also adapted to retain the result of the analysis and having means for controlling said entry-receiving means, means for causing said actuating means controlled storing mechanism to govern after analysis in said earlier period and before the entering operation in said later period said entry-receiving means controlling storing mechanism, means for clearing said entry-receiving means controlling storing mechanism before said governing operation, and means for clearing said actuating means controlled storing mechanism after said governing operation and before control of said latter storing mechanism by the analyzing means.

6. A machine controlled by perforated record cards having a plurality of separate designation bearing portions, a perforation or perforations in each portion representing a single distinct value, entry-receiving means having a plurality of units under the supervision of said portions and controlled in a later period in accordance with the result of the analysis in an earlier period, a common set of analyzing means for successively analyzing said portions, a storing mechanism having a storing unit for each portion for retaining the result of the analysis, means under the control of said analyzing means for actuating said storing units in accordance with the analysis of the related portions, and means for successively placing different storing units of said storing mechanism under the control of said actuating means upon the successive analysis of said plurality of portions, another storing mechanism also adapted to retain the result of the analysis and having means for controlling during the analyzing period said entry-receiving means, the total analyzing period for the successive analysis of said plurality of portions by said common analyzing means and the controlling period of said entry-receiving means corresponding to said plurality of portions being about of equal length, means for causing said actuating means controlled storing mechanism to govern after analysis in said earlier period and before the entering operation in said later period said entry-receiving means controlling storing mechanism, means for clearing said entry-receiving means controlling storing mechanism before said governing operation, and means for clearing said actuating means controlled storing mechanism after said governing operation and before control of said latter storing mechanism by the analyzing means.

7. A machine controlled by perforated record cards having a plurality of separate designation bearing portions, a perforation or perforations in each portion representing a single distinct value, entry-receiving means having a plurality of units under the supervision of said portions and controlled in a later period in accordance with the result of the analysis in an earlier period, a common set of analyzing means for successively analyzing said portions, a storing mechanism having a storing unit for each portion for retaining the result of the analysis, means under the control of said analyzing means for actuating said storing units in accordance with the analysis of the related portions, and means for successively placing different storing units of said storing mechanism under the control of said actuating means upon the successive analysis of said plurality of portions, another storing mechanism also adapted to retain the result of the analysis and having means for controlling during the analyzing period simultaneously a plurality of said entry-receiving units in accordance with the result of said analysis, means for causing said actuating means controlled storing mechanism to govern after analysis in said earlier analyzing period and before the entering operation in said later period said entry-receiving means controlling storing mechanism, means for clearing said entry-receiving means controlling storing mechanism before said governing operation, and means for clearing said actuating means controlled storing mechanism after said governing operation and before control of said latter storing mechanism by the analyzing means upon analysis of the subsequent card.

8. A machine controlled by perforated record cards having a plurality of separate designation bearing portions, the perforations in each portion representing a single distinct value, entry-receiving means having a plurality of units under the supervision of said portions and controlled in a later period in accordance with the result of the analysis in an earlier period, a common set of analyzing means for successively analyzing said portions, a storing mechanism having a storing unit for each portion for retaining the result of the analysis, means under the control of said analyzing means for actuating said storing units in accordance with the analysis of the related portions, and means for successively placing different storing units of said storing mechanism under the control of said actuating means upon the successive analysis of said plurality of portions, another storing mechanism also adapted to retain the result of the analysis and having means for controlling during the analyzing period said entry-receiving means, means for causing said actuating means controlled storing mechanism to govern after analysis in said earlier analyzing period and before the entering operation in said later period said entry-receiving means controlling storing mechanism, means for clearing said entry-receiving means controlling storing mechanism before said governing operation, and means for clearing said actuating means controlled storing mechanism after said governing operation and before control of said latter storing mechanism by the analyzing means upon analysis of the subsequent card.

MICHAEL MAUL.